Patented Dec. 4, 1934

1,983,414

UNITED STATES PATENT OFFICE 1,983,414

BILE ACID AMIDES AND THEIR PREPARATION

Arthur Stoll and August Binkert, Basel, Switzerland, assignors to Swiss firm of Chemical Works formerly Sandoz, Basel, Switzerland No Drawing. Application March 1, 1933, Serial No. 659,235. In Germany April 9, 1932

17 Claims. (Cl. 260—106)

This invention relates to the manufacture of new derivatives of bile acids.

It has been found, that new derivatives of bile acids can be prepared by treating 1,8-aminonaphtholsulphonic acids with functional derivatives of bile acids, such as their azides, chlorides and others.

One object of the present invention is to provide a new process for the manufacture of 1,8-aminonaphtholsulphonic acids containing bile acid radicals.

Another object of the present invention is to provide a new process for the manufacture of derivatives of bile acids, this process consisting in treating 1,8-aminonaphthol-sulphonic acids with azides of bile acids and their derivatives.

Another object of the present invention is to provide a new process for the manufacture of derivatives of bile acids, this process consisting in treating 1,8-aminonaphthol-sulphonic acids with chlorides of bile acids and their derivatives.

A further object of the present invention is to provide new bile acid derivatives of 1,8-aminonaphthol-sulphonic acids which will be especially applicable for therapeutical purposes and for the manufacture of therapeutical valuable preparations.

The present invention contemplates new methods for the manufacture of synthetic therapeutically valuable compounds and the use for this purpose of bile acid derivatives capable to react with 1,8-aminonaphthol-sulphonic acids.

The term "bile acids" embraces both substituted and unsubstituted bile acids, typical examples being cholic acid, desoxycholic acid, glycocholic acid, taurocholic acids, acylated bile acids such as diformyldesoxycholic acid, triacetylcholic acid, acetylglycocholic acid. The term "functional derivatives of bile acids" embraces the derivatives of bile acids capable to react with 1,8-aminonaphthol-sulphonic acids, typical examples being cholic acid azide, desoxycholic azide, diformyldesoxycholic acid chloride, triacetyl cholic acid chloride, acetylglycocholic acid chloride, and others.

The term "1,8-aminonaphthol-sulphonic acids" embraces both substituted and unsubstituted 1,8-aminonaphthol-mono-, di- and tri-sulphonic acids and their salts, typical examples being: 1,8,3,6-aminonaphthol-disulphonic acid, 1,8,2,4-aminonaphthol-disulphonic acid, 1,8-aminonaphthol-4-sulphonic acid.

In producing the new compounds, the salts of 1,8-aminonaphthol-sulphonic acids are dissolved or suspended in water or in a mixture of water and an organic solvent and are treated preferably in presence of an alkali or of an acid binding agent with functional derivatives of bile acids. For the manufacture of the new compounds there are especially suitable the azides and chlorides of bile acids, but also other derivatives of bile acids may be used.

In the manufacture of the new compounds it is also contemplated to use dispersion agents in case where the starting materials are not in a sufficient dispersion state. It is, therefore, contemplated to conduct the reaction under such conditions, where the starting materials are dissolved, or partially dissolved or remain in suspension during the manufacturing process.

The bile acid derivatives resulting from the reaction are generally easily soluble in water, but can be precipitated from their solutions by means of common salt or by addition of organic solvents.

In the dry state they are generally grey powders, easily soluble in water, but insoluble in organic solvents nonmiscible with water. When used as free acids or acid salts they yield acid reacting solutions, but their salts give neutral solutions.

They are probably bile acid-amides of 1,8-aminonaphthol-sulphonic acids, as by treating them with strong mineral acids, it becomes possible to split off the bile acid radical. The new products, when treated with nitrous acid, do not yield diazo compounds, but when they are pretreated with strong mineral acids they give diazo compounds of the starting 1,8-aminonaphtholsulphonic acids.

It is therefore probable that they possess the following general formula:

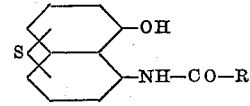

wherein S represents at least one sulphonic acid group and R—CO represents a bile acid radical.

The new products resulting from the present process are suitable for therapeutical use and for the manufacture of therapeutically valuable preparations.

The following examples without being limitative, illustrate the present process, the parts being by weight:

Example 1

24 parts of the acid sodium salt of 1,8,3,6-aminonaphthol-disulphonic acid are dissolved in 90 parts of an N-sodium hydroxide solution, then 90 parts of an N-sodium hydroxide solution and a suspension of 26 parts of cholic acid azide (prepared by treating 25.4 parts of cholic acid hydrazide with the theoretical quantity of hydrochloric acid and sodium nitrite, filtering off and washing with water) in 150 parts of icewater, are added by small portions thereto, whereby care is taken that the reaction mixture shows always an alkaline reaction. After standing for some time, the reaction mixture is carefully warmed up to 60° C., whereby the added azide reacts completely and a clear wine-red solution results. The solution is then cooled down, acidified with acetic acid and allowed to stand over night. In order to separate the cholic acid produced by saponification of some azide, the solution is filtered and to the filtrate are added two volume parts of a saturated sodium chloride solution, whereby the new product becomes precipitated. The precipitate is then separated by filtering, washed with sodium chloride solution and dried in vacuo.

The raw 1,8,3,6-cholalylaminonaphthol-disulphonic acid obtained may be recrystallized from alcohol. In dry state it is a grey powder, which becomes decomposed at 300° C. without melting. It is soluble in water and alcohol with an acid reaction. When subjected to the action of nitrous acid, the new compound does not give a diazocompound; this shows that the amino group is substituted by the cholalyl radical. By treating the new product with hot hydrochloric acid, the cholalyl radical is split off.

The saponification of the amide group takes place very easily on treatment with hydrochloric acid; even a cold hydrochloric acid solution of the new compound decomposes on standing and yields a precipitate of cholic acid.

Example 2

24 parts of 1,8,2,4-aminonaphthol-disulphonic acid are dissolved in 90 parts of an N-sodium hydroxide solution and treated as described in Example 1 with 90 parts of an N-sodium hydroxide solution and 26 parts of cholic acid azide. At the end of this treatment the solution is heated for 30 minutes up to 55° C., acidified with acetic acid and the new product precipitated by adding to the solution four times its volume of a saturated sodium chloride solution.

The acid sodium salt of 1,8,2,4-cholalylaminonaphthol-disulphonic acid obtained in this manner is in dry state a greyish powder, easily soluble in water with an acid reaction on litmus, difficultly soluble in alcohol and nearly insoluble in organic solvents. In concentrated sulphuric acid it yields a yellow solution with a green fluorescence.

Example 3

24 parts of 1,8,3,6-aminonaphthol-disulphonic acid are dissolved in 90 parts of an N-sodium hydroxide solution and 25 parts of desoxycholic acid azide (prepared by treating 24.4 parts of desoxycholic acid hydrazide with the theoretical quantity of hydrochloric acid and sodium nitrite) are added thereto. While well stirring the suspension thus obtained there are added thereto within 15 minutes 90 parts of an N-sodium hydroxide solution, and the reaction mixture is heated for 30 minutes to 55° C. By acidifying the solution with acetic acid a large precipitate is formed, which is separated by filtration. The filtrate is concentrated in vacuo at 50° C. to a small volume and treated with absolute alcohol until a thick precipitate is obtained. The same is then separated from the solution, washed with alcohol and recrystallized by dissolving it in 30 parts of hot water and adding to the hot solution 500 parts of alcohol in such a manner that the solution remains boiling during the whole time. After filtration of the hot solution, the isolated 1,8,3,6-desoxycholalylaminonaphthol-disulphonic acid is dried in vacuo. It is a greyish powder, easily soluble in water, yielding solutions acid to litmus. Its solutions in concentrated sulphuric acid are at first colorless, but become yellow on standing.

Example 4

24 parts of 1,8-aminonaphthol-4-sulphonic acid are dissolved in 150 parts of water and 100 parts of an N-sodium hydroxide solution. A solution of 47 parts of diformyldesoxycholic acid chloride in 250 parts of ether is added thereto and the mixture is shaken during some hours, whereby the lower aqueous part becomes a thin paste. After standing for some hours, the upper etheric part is separated, the precipitate contained in the aqueous part filtered off, washed with water and alcohol and dried in vacuo.

The 1,8-diformyldesoxycholalylaminonaphthol-4-sulphonic acid obtained in this manner is a greyish powder, soluble in water and rather difficultly soluble in alcohol, but insoluble in ether. Its aqueous solutions have an acid reaction, foam very strongly on shaking and do not become brown colored on standing.

The diformyldesoxycholic acid chloride may be prepared by treating diformyldesoxycholic acid with thionyl chloride or a phosphorus chloride at 60–70° C. and is a yellowish amorphous body, which is easily soluble in ether, whereas the starting acid is insoluble therein.

The above examples illustrate the process as being carried out in presence of a slight excess of sodium hydroxide. Instead of this alkaline compound other alkaline compounds selected from alkalimetal- and alkaline earth metal hydroxides, oxides or carbonates may be used. It is contemplated to carry out the reaction in presence of potassium hydroxide or carbonate or sodium carbonate, or hydroxides and carbonates of barium and calcium.

The quantities of alkaline compounds may also vary within wide limits, but it is preferable to carry out the condensation at least in presence of a small excess of the alkaline compound.

What we claim is:—

1. A process for the manufacture of derivatives of bile acids, characterized in reacting 1,8-aminonaphthol-sulphonic acids with derivatives of bile acids selected from the class consisting of azides and acid chlorides of bile acids.

2. A process for the manufacture of derivatives of bile acids, characterized in reacting 1,8-aminonaphthol-sulphonic acids with derivatives of bile acids selected from the class consisting of azides and acid chlorides of bile acids, in the presence of inert solvents.

3. A process for the manufacture of derivatives of bile acids, characterized in reacting 1,8-aminonaphthol-sulphonic acids with derivatives of bile acids selected from the class consisting of azides and acid chlorides of bile acids, in an aqueous medium.

4. A process for the manufacture of derivatives of bile acids, characterized in reacting the salts of 1,8-aminonaphthol-sulphonic acids with derivatives of bile acids selected from the class consisting of azides and acid chlorides of bile acids, in an aqueous medium.

5. A process for the manufacture of derivatives of bile acids, characterized in reacting the salts of 1,8-aminonaphthol-sulphonic acids with derivatives of bile acids selected from the class consisting of azides and acid chlorides of bile acids, in an aqueous medium and in the presence of acid-binding agents.

6. A process for the manufacture of derivatives of bile acids, characterized in reacting the salts of 1,8-aminonaphthol-sulphonic acids with derivatives of bile acids selected from the class consisting of azides and acid chlorides of bile acids, in an aqueous medium and in the presence of alkaline compounds of alkali-forming metals.

7. A process for the manufacture of derivatives of bile acids, characterized in reacting the salts of 1,8-aminonaphthol-sulphonic acids with derivatives of bile acids selected from the class consisting of azides and acid chlorides of bile acids, in an aqueous medium and in the presence of alkaline agents selected from the class consisting of alkali metal and alkaline earth metal oxides, hydroxides and carbonates.

8. A process for the manufacture of derivatives of bile acids, characterized in reacting the salts of 1,8-aminonaphthol-sulphonic acids with derivatives of bile acids selected from the class consisting of azides and acid chlorides of bile acids, in an aqueous medium and in the presence of alkali metal hydroxides.

9. A process for the manufacture of derivatives of bile acids, characterized in reacting the salts of 1,8-aminonaphthol-sulphonic acids with derivatives of bile acids selected from the class consisting of azides and acid chlorides of bile acids, in an aqueous medium and in the presence of sodium hydroxide.

10. A process for the manufacture of a bile acid derivative, characterized in reacting the sodium salt of 1,8,3,6-aminonaphthol-disulphonic acid with desoxycholic azide in an aqueous medium and in presence of sodium hydroxide.

11. A process for the manufacture of a bile acid derivative, characterized in reacting the sodium salt of 1,8,2,4-aminonaphthol-disulphonic acid with cholic acid azide in an aqueous medium and in presence of sodium hydroxide.

12. A process for the manufacture of a bile acid derivative, characterized in reacting the sodium salt of 1,8-aminonaphthol-4-sulphonic acid with diformyldesoxycholic acid chloride in an aqueous medium and in presence of sodium hydroxide.

13. The bile acid derivatives of 1,8-aminonaphthol-sulphonic acids, which are in the dry state colorless to greyish powders, soluble in water and in alcohol, but generally insoluble in organic solvents immiscible with water, which on treatment with nitrous acid do not give diazo compounds, which on treatment with strong mineral acids are hydrolyzed to the starting 1,8-aminonaphthol-sulphonic acids and which can be used in the therapy and for the manufacture of therapeutical products.

14. The bile acid derivatives of 1,8-aminonaphthol-sulphonic acids which probably possess the general formula:

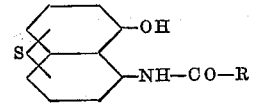

wherein S represents one or more sulphonic acid groups and R—CO a bile acid radical, which are in the dry state colorless to greyish powders, soluble in water and in alcohol, but generally insoluble in organic solvents immiscible with water, which on treatment with nitrous acid do not give diazo compounds, which on treatment with strong mineral acids are hydrolyzed to the starting 1,8-aminonaphthol-sulphonic acids and which can be used in the therapy and for the manufacture of therapeutical products.

15. The 1,8-desoxycholalylaminonaphthol-3,6-disulphonic acid, which is in the dry state a greyish powder, easily soluble in water in form of its mono-sodium salt, yielding solutions with an acid reaction on litmus, and sparingly soluble in cold, better in warm alcohol, which on treatment with nitrous acid does not yield a diazo compound and on hydrolysis gives 1,8,3,6-aminonaphthol-disulphonic acid, and which can be used in the therapy and for the manufacture of therapeutical preparations.

16. The 1,8-cholalylaminonaphthol-2,4-disulphonic acid, which is in the dry state a greyish powder, easily soluble in water in form of its mono-sodium salt, yielding solutions with an acid reaction on litmus, difficultly soluble in alcohol and nearly insoluble in organic solvents immiscible with water, which on treatment with nitrous acid does not yield a diazo compound and on hydrolysis gives 1,8,2,4-aminonaphthol-disulphonic acid, and which can be used in the therapy and for the manufacture of therapeutical preparations.

17. The 1,8-diformyldesoxycholalylaminonaphthol-4-sulphonic acid, which is in the dry state a greyish powder, soluble in water yielding stable solutions and possessing an acid reaction, difficultly soluble in alcohol and insoluble in organic solvents immiscible with water, which on treatment with nitrous acid does not yield a diazo compound and on hydrolysis gives 1,8-aminonaphthol-4-sulphonic acid, and which can be used in the therapy and for the manufacture of therapeutical preparations.

ARTHUR STOLL.
AUGUST BINKERT.